July 24, 1951　　　D. E. MARSHALL　　　2,561,392
PROCESS AND APPARATUS FOR TREATING SOLUTIONS
TO RECOVER AND COAT SOLID PARTICLES
Filed Aug. 11, 1945　　　　　　　　　　　3 Sheets-Sheet 2
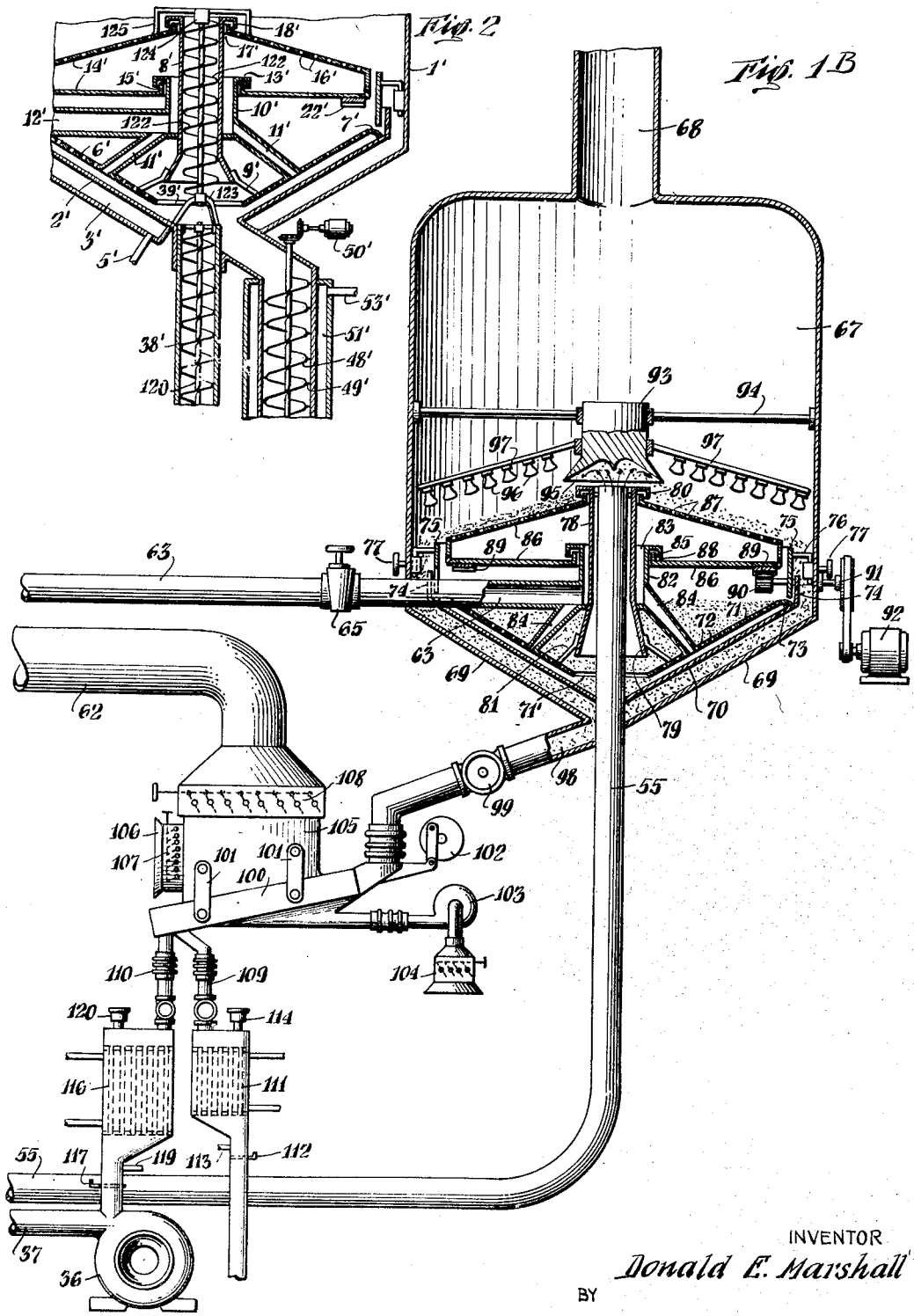
INVENTOR
Donald E. Marshall
BY
Ernest D. Given　ATTORNEY

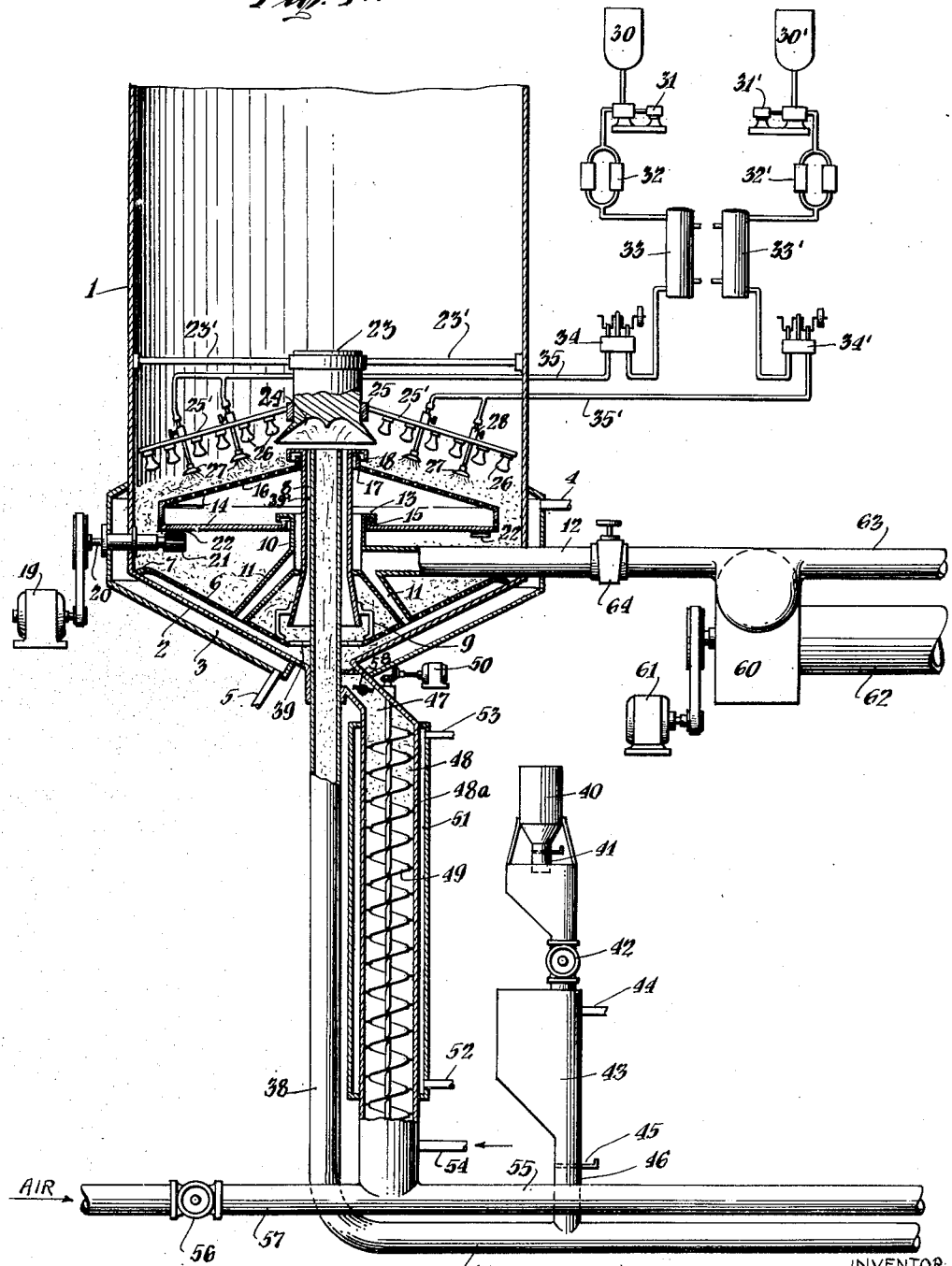

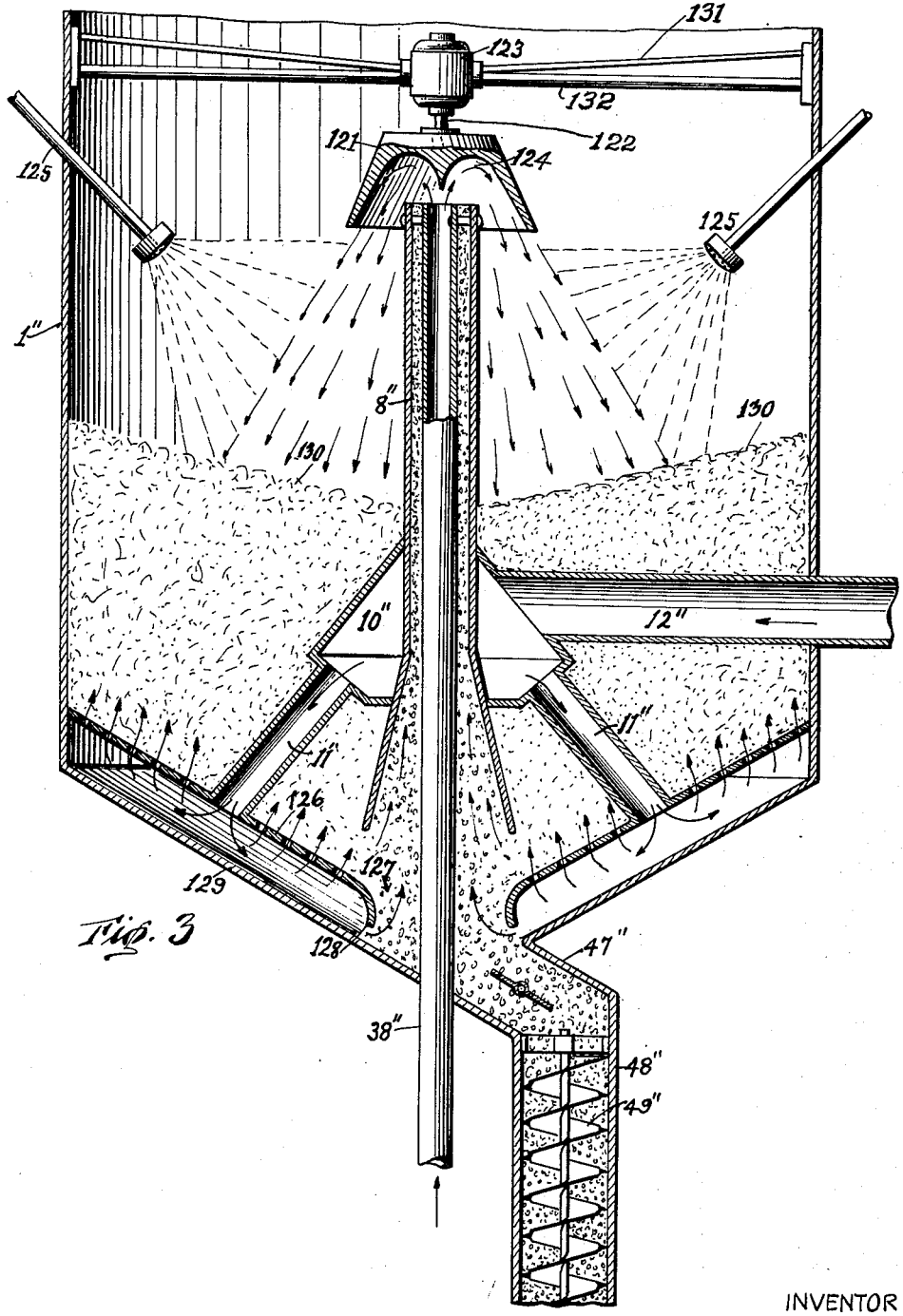

Patented July 24, 1951

2,561,392

UNITED STATES PATENT OFFICE 2,561,392

PROCESS AND APPARATUS FOR TREATING SOLUTIONS TO RECOVER AND COAT SOLID PARTICLES

Donald E. Marshall, Summit, N. J.

Application August 11, 1945, Serial No. 610,312

10 Claims. (Cl. 117—100)

This invention relates to a process and apparatus for treating materials, such as detergent mixtures, milk, fruit juices, and chemical solutions in such a way as to produce solid particles of nuclei, and then apply one or more thin layers of the same or other solid materials to said nuclei by spraying thereon liquids which carry solid materials and removing the liquids as vapors thus forming dense uniform beads.

Beads or pellets of different sorts of material such as chemicals and dehydrated foods can be enclosed in protecting coatings or layers, and ordinary powdered detergents can be shaped into the form of dense beads in accordance with this invention.

Beads or pellets offer many advantages over the ordinary powdered form of chemicals or dehydrated foods. Reconstituting into liquids is improved, as the beads do not present surface tension—solubility trouble, and can be made heavy enough to sink in the liquid.

Detergents in dense bead form save packaging cost, are dust-free, easy to pour or measure, and are favorable for going in solution without attaching to clothes.

With this invention fertilizers and insecticides can be processed into bead form, instead of being in the form of dust, so that they can be put into the ground with drills in close proximity to seeds without waste and in controlled amounts.

Seeds themselves can be coated with suitable material to increase their size to a bead that can be drilled and spaced when seeded to avoid crowding and later thinning out of plants. Since the coating is applied at low temperature it is not harmful to the seed.

Prepared breakfast cereals can be ground, formulated, pre-cooked and then spray-dried and toasted in bead form ready for packaging.

Milk, soup, coffee solutions, fruit juices, and vegetable juices can be rapidly dehydrated in accordance with this invention by removing moisture therefrom at low temperature and low pressure to preserve flavors and in such a way that dense beads having soluble protective shells are formed that are distinctive and are less liable to deteriorate.

Beads of materials can be developed in such a way as to make finished products of special characteristics not possible in powdered form. For instance, a heavy-duty laundry bead can be formed with a nucleus of unbleached-fat soap, coated with solid caustic in the right proportion to neutralize the acidity of the soiled-clothes, followed by a coating of bleached-fat neutral soap to serve as a protective coating over the caustic and to give a white finished product. In the same manner, a layer of dispersing agent can be incorporated in the bead which otherwise might lessen its sudsing property.

Many chemical processes or reactions can be carried out in accordance with this invention. Difficult reactions, such as the saponification of glycerides can be caused to take place rapidly by atomizing the proper preparations of fats and caustics and depositing the atomized mixture on the surfaces of nuclei, such as solid soap particles. In this way, and at the proper temperature, the desired chemical reaction is caused to take place quickly. Also, excess water can be reduced.

Also, chemical reactions, such as re-esterification of fats with methanol to separate glycerine, followed by saponification of the methyl ester and removal of the alcohol that is to be recovered, can be carried out very advantageously in accordance with this invention, since the reaction is caused to take place in a closed chamber and is so controlled that the reaction goes to completeness, and a beaded form of reaction product is produced.

Neutralization stages in soap and synthetic detergent manufacture can likewise be performed with great economy of equipment and energy, together with precise control of conditions favorable to the reaction and to the product.

Apparatus is provided so that liquids having solids dissolved or mixed therein can be processed as they are sprayed or flashed onto a moving sheet or bed of finely divided solid particles in such a way that the surface of these particles are thoroughly exposed to heat so that vaporization or chemical reaction can be caused to occur on these surfaces.

Also, this new liquid layer together with the temperature which causes softening of the nuclei prepares the surface of the bead for the adherence of accompanying dust. These adhered dust particles and a newly dried liquid layer can be further pressed to form the bead surface by the impact of a stream of solid particles against a reflecting surface and impact of reflected stream of solid particles against the aerated bed of solid particles itself in a circulating spray chamber.

A mass of the material under treatment can be recycled in such a way that short travel of the material being formed takes place and heating and spraying is caused to take place without clogging the apparatus. Freshly sprayed material can be tumbled and pressed by impact into beads which increase in size each time they are sprayed.

The material being treated can be spread upon a revolving surface to cause uniform spreading by centrifugal force as the material is being sprayed. Also, an aeration-surface and a chamber through which drying gas can be introduced are provided. In this way moisture is removed with minimum entrainment of solid particles. Also tumbling and spinning assists bead formation.

Large amounts of drying gas can be brought into intimate contact with circulating material in spraying and drying chambers at low pressure. This gas can be passed successively through a bed of material, a sheet of material and a spray of liquid, to remove moisture without serious entrainment of solid particles. This gas also keeps the material fluidized.

A downward delivery duct from the spray chamber is provided for removing freshly sprayed and dried material. This duct is jacketed to keep optimum surface temperature so that it will not clog or foul. A loose-fitting revolvable helix agitator is placed in it to assist and regulate the downward movement of the freshly sprayed material to a conveying zone.

By aerating this delivery duct and mass of solid particles and restricting its inlet, an elutriator effect can be maintained which will allow beads of only a certain size and weight to enter the delivery duct. Lighter and smaller particles that are prevented from leaving the spray chamber by this air stream are recycled and resprayed until they are large enough to emerge.

Provision is made for withdrawing only a portion of the recycled material after spraying it, in order to deliver it to the evaporating chamber while withdrawing a portion at the evaporating chamber to remove finished beads. In this way, the proper size of chamber as well as the proper cycle of time for spraying and evaporating are provided regardless of rate of transfer or withdrawal of material.

Some separation of larger particles from smaller particles can be accomplished also by centrifugal force on a revolving cone, and further precise grading can be accomplished by means of a vibrating air table.

A down flow cooler is provided in which fluidized material is moved by gravity and is turbulently brought into contact with a cooling surface thus safeguarding against deterioration due to heat and exposure.

With this invention solids in solutions or mixed with liquids can be recovered without local overheating, which usually occurs when heat must penetrate through clusters or viscous masses of material.

A mucilaginous liquid or binder may be used when desired to aid the formation of beads of the solid material.

Some of the advantages which this invention has been found to possess are:

(a) Relatively small spray chamber can be used without walls or sprays being fouled and with attending savings in heat loss, investment, operating labor and controlled sanitation.

(b) Complete control over air flow, heat application, dust, reaction time, and product formation is obtained.

(c) Multiple, air and solids, passes are provided and high velocity of solids is produced, thus gaining high reaction rate with minimum air flow and waste heat.

(d) Extreme atomization at sprays is produced for gaining constant rate reaction but yielding a uniformly beaded, dense and dust-free finished product.

(e) Levelling effect of recycling freshly sprayed small particles with multiple coated larger particles, and recycled portion of evaporated beads, raises permissable operating temperature to high level and high efficiency.

(f) Evaporating chamber conditions are produced favorable to vacuum operation, due to complete dust control, small amount of air introduction, and opportunity to use radiant heat, all within a relatively small closed system.

(g) Finished beads having structure derived from multiple sprayings of various liquids bearing solids are obtained.

(h) Simplicity of elutriator type classifier.

(i) Impact of laden air stream on a high speed spinning reflector is caused to press beads into dense uniform shape.

The invention may be better understood from the following description in connection with the accompanying drawings in which:

Fig. 1A is a side view partly in section, showing a portion of an illustrative embodiment of the invention;

Fig. 1B is a similar view, showing the remainder thereof;

Fig. 2 is a section showing a modification of some of the parts; and

Fig. 3 shows a third modification of the spraying and evaporating chambers.

In the drawings, reference character 1 indicates an upwardly extending spray and flash chamber that is open at its upper end. It has a conical bottom 2 that is provided with a jacket 3 which has an inlet 4 and an outlet 5 for temperature controlling or heating fluid.

A perforated cone 6 is spaced from the bottom 2 by means of its flange 7. A sparger tube 8 is supported by a bracket 9 on the perforated cone 6. A cylinder 10 surrounds the sparger tube 8 and is provided at its bottom portion with downwardly and outwardly extending outlets 11 that pass through the cone 6. An inlet air pipe 12 for hot air passes into the chamber 1 and enters the cylinder 10 near the bottom thereof. An outwardly and downwardly extending flange 13 is provided at the upper end of the cylinder 10. A revolvable riffling cone 14 has a flat bottom with a flange 15 extending within the flange 13 to provide a substantially closed joint. Perforations 16 are provided through the sloping surface of the cone 14. A cylindrical rim 17 is provided at the upper end of the cone 14 and a circular flange 18 at the upper end of the tube 8 provides a reasonably close fit with rim 17.

A motor 19 drives the shaft 20 which is journalled in the walls of the chamber 1 and jacket 3 and passes through these walls. A gear 21 on the shaft 20 meshes with a circular or annular rack 22 that is attached to the bottom of the cone 14.

A reflecting device 23 for a particle-laden air stream is anchored by rods 23' along the center line of the chamber 1. It has a pelton cup surface 24 at its lower end. An annular ring 25, carrying supports 25', is mounted on the device 23. Heaters 26 are carried by the supports.

Containers 30 and 30' are provided for the liquids such as solutions of different sorts, for example, that are to be treated with this apparatus. Pumps 31 and 31' are for passing the liquids from the containers 30 and 30' through strainers 32 and 32'. Heat exchangers 33 and 33' are provided and the high pressure pumps 34 and 34' force the liquids from the heat exchangers through pipe 35 and 35' to the nozzles 27. An air blower 36 (Fig. 1B) is provided and has an outlet pipe 37 extending therefrom into the lower end of an aerating tube or feeder 38 (Fig. 1A) which is sealed in the center of the conical bottom 2, and extends to the upper end of tube 8, leaving an annular space 39 between this feeder 38 and the perforated cone 6 and annular space 39' between it and tube 8.

A feeder 40 for particles of solid material is provided with a regulatable outlet 41 and an air lock 42. The outlet from this feeder extends into a hopper 43 which is provided with an inlet 44 from a source of compressed air, not shown. A slide valve 45 is provided near the bottom of the hopper 43 in the outlet 46 which extends into the pipe 37.

An outlet 47 with a valve 58 therein extends from the lowest portion of the cone 2 into the upper end of a down feeder 48 which has a loosely fitted worm screw 49 therein, driven by a motor 50. This screw is provided with scraper pins 48a for keeping the inside of the feeder 48 clean. This feeder 48 is provided with a cooling jacket 51 having an inlet 52 and an outlet 53 for cooling fluid. An inlet 54 for air under pressure for fluidizing the solids in the feeder 48 is provided near the lower end of this feeder. A feed duct 55 for discharged solids to be further treated extends from the lower end of the feeder 48. A valve 56 is provided for controlling air from a source of compressed air in the pipe 57 which feeds air into the pipe 55.

An air fan 60 driven by the motor 61 feeds hot air that is derived from the process as described later, through pipe 62 into the pipe 63 which is controlled by valves 64 and 65.

An evaporating chamber 67 (Fig. 1B) is provided, having an outlet 68 at its upper portion and having a conical bottom 69. A cone 70 is spaced from the bottom 69 and is fixed in position with the pipe 55 extending through the apex of this cone and hermetically sealed thereto. The cone 70 is provided with a short cylindrical portion 74 at its upper end. A cone 71 having a central opening 71' and perforations 72 and a curved rim 73 is provided, which rests on the cone 70. An adjustable baffle ring 75 is provided in connection with the rim 74 of the cone 70 to vary the effective height of the cylindrical portion of this cone. This ring is adjustable by means of arms 76 and set screws 77.

A sparger tube 78 having a flaring lower end 79 and flanged upper end 80 is provided and is supported by supports 81 resting on cone 71, which keeps it in place. A tube 82 that is of greater diameter than tube 78 is provided around tube 78, leaving annular passageway 83 which the pipe of tube 63 enters. This tube 63 extends into the lower portion of the tube 82, as indicated, and an annular series of tubes 84 diverging outwardly in a downward direction provides passages from the lower portion of the tube 82 to the cone 70. An outwardly and downwardly turned flange 85 is provided at the upper end of the tube 83.

A revolving container 86 having a conical perforated top portion 87 and a solid flat bottom and a circular side wall portion, is provided with a flange 88 at its middle portion surrounding an opening at the center of its bottom and extending within the flange 85. A toothed annular rack 89 is provided on the bottom of the container 86. This rack is driven by a gear 90 on a shaft 91 that is driven by the motor 92.

A reflecting and impinging device 93, aligned with the tube 78, is held in the center of the chamber 67 by means of supports 94. This device has a pelton cup end 95. Infra red heaters 96 are supported by downwardly and radially extending arms 97 that are attached to the device 93.

An outlet 98 extends from the conical bottom 69 and has a valve 99 therein. A vibrating table 100 is provided for separating particles of different sizes from outlet 98. This table is suspended by straps 101 and is shaken or vibrated by means of the motor 102. A blower 103 is provided to pass cooled air from the air cooler 104 to the table 100. An air outlet 105 is provided from the table 100. An air supply inlet 106 is provided and has a damper 107. A heater 108 for the air is provided in the air outlet 105, which is connected to the pipe 62.

Valved outlets 109 and 110 are provided from the table 100 for the particles of the desired size and for the particles that are to be re-treated to increase the size thereof, respectively. A cooler 111 is provided for the particles of proper size. It has an air-lock or outlet 112 for withdrawing finished material when desired. It is also provided with an air inlet 113 for compressed air, and with a filtered exhaust 114.

A cooler 116 is provided for particles that are to be re-treated. This cooler is also provided with an air-lock or outlet 117 for these particles. Inlet 119 is provided for introducing compressed air into the cooler 116 and a filtered exhaust 120 is provided for this cooler.

In the modification shown in Fig. 2, parts like those shown in Fig. 1A are designated by the same reference characters with primes. A screw conveyor 120 which may be driven in any convenient way is provided in the feeder 38' and a screw conveyor 122 is provided in the tube 8'. The lower end of this conveyor is journalled in a bracket, as indicated at 123, and its upper end is journalled at 124 in a bracket 125 that is attached to the cone 14'.

Another form of spraying chamber is shown in Fig. 3. It does not have a revolving cone surface, such as the cone 14 in Fig. 1A.

In this modification a revolving reflector 121 is provided which is supported by struts 122 attached to spray chamber 1'' and driven by motor 123 and has a pelton surface 124. Sprayers 125 extend into the chamber 1''.

The tube 8'', chamber 10'', outlets 11'', air inlet pipe 12'', feeder tube 38'', outlet 47'', feeder 48'' and worm screw 49'' correspond to those shown in Fig. 1A.

A perforated cone 126 having a central opening 127 and a downturned lip 128 along this central opening is supported a short distance above the conical bottom 129 of chamber 1''. This design contemplates high velocity sparger action and the reflecting pelton cup 121 is mounted on a revolving shaft 122, driven at high speeds by a directly connected motor 123. The motor and pelton cup are supported by braces 131 and 132.

The particle-laden air stream from sparger tube 8'' and feed tube 38'' impinges and is spun into a reflect umbrella-shaped down spill which forms a uniform and complete sheet of material sufficient to intercept all the freshly sprayed liquid from nozzles 125.

Since plenum chamber 10'' is completely submerged in aerated bed of material carried at level 130 no exposed surfaces are presented to sprays which otherwise might become fouled.

In this arrangement it is contemplated that feed tube 38" will be operated as an air-veyor and as such, will induce greater sparger action to develop greater recirculation and a better bead forming impact.

The operation is as follows:

The air fans 60 and 103 and heater 108 are started to provide the proper air pressures and heat in the system. A solution from one of the containers 30 or 30', or solutions from both are passed by one or both pumps 31, 31' through strainers 32, 32' and heaters 33, 33' and by corresponding pumps 34, 34' and spray nozzles 27 into chamber 1, where the heaters 26 produce flash-dried particles which fall upon the perforated surface 14 which is being revolved by motor 19. The heated air currents from inlet 12 cause the remaining volatile material in the particles to vaporize and pass out of the top of the chamber 1. The solid particles thereby produced pass downwardly along the perforated surface 14 while hot air from pipe 12' passes through the perforations 16 drying and aerating this layer of particles. The solid particles resulting therefrom then fall over the edge of cone 14 and pass along the perforated surface 6 where the hot air, which is introduced through pipe 12 and outlets 11 into the space between conical bottom 2 and perforated cone 6 and then through the perforations in cone 6 aerates and dries the bed of accumulating particles. Hot air emerging from annular opening 39 develops an air-veyor in tube 8, and carries the accumulating particles up the space 39' between tubes 8 and 38. The particle-laden air stream impinges upon the surface 24 and is reflected to the perforated surface of cone 14, so that they are coated by the spray from nozzles 27. The larger particles on cone 6 pass down through the opening 39 into the feeder 48.

The volatile material in these coatings is vaporized, leaving shells of solid material on the solid particles to form a larger bead. The shells build up each time the particles pass upwardly through tube 8 and under sprays 27 until they become large enough to fall by gravity through the draft in annular space 39 and outlet 47 into the down feeder 48 where they are cooled. They also are fluidized in this feeder by cool air introduced under pressure at inlet 54. By adjusting this air and valve 58 in outlet 47 a desired size and weight of particle will be discharged from the spraying chamber 1.

When it is desired to coat nuclei of solid particles with coatings of solid material from solutions thereof, such particles are fed from hopper 43 through slide valve 45 and are carried by air in pipe 37 from blower 36 through pipe 38 and spill outwardly over flange 18 and pass along the perforated surface 16 of cone 14 where they are sprayed with the solution from sprayers 27. The coated nuclei flow to vortex of chamber 1 and sparger action of air currents through pipe 38 carries out their recirculation through the annular space 39'. They pass into feeder 48 when they have become coated sufficiently to reach the proper size or weight.

In the modification shown in Fig. 3 the solution is introduced through sprayers 125 and coats the particles that are reflected from the revolving surface 124 in umbrella form. These particles are aerated and dried by hot air from pipe 12" passing through the perforations in cone 126 and are recirculated through the annular space between inlet 38" and tube 8" by sparger action until they are built up to the desired size, whereupon they pass into the conveyor 48".

The particles of larger sizes which reach the feed duct 55 are carried by compressed air, when valve 56 is open, up into chamber 67 by spilling outwardly over the flange 80 against surface 95 and then along perforations 87 in the upper sloping surface of container 86 where volatile material is evaporated by heat from infra red lamps 96 and hot air from pipe 63. A vacuum may be maintained in the outlet 68 in any convenient way when negative-pressure, low temperature evaporation is required. In this case air supply must be properly throttled by valves 65 and 56.

In this evaporation chamber 67 where bound moisture is to be removed from larger particles, the time cycle may need to be longer and the chamber larger than flashing and spraying chamber 1 in order to obtain the required holding time. Otherwise the circulation of the particles by sparger action is like that already described.

By use of infra-red heaters, a glaze may be developed by melting the surface of the beads and ironing action may be produced by impingement on the reflecting surface 95.

An additional grading is accomplished in this finishing chamber by adjusting the ring 75 and the speed of cone 86 so as to throw the larger beads into the hopper 69 and delivering them through pipe 98 to the vibrating table 100 where they are completely graded and cooled. The particles that have been built up to the desired size are separated by this table and passed by outlet 109 to the cooler 111 and are withdrawn for use through air-lock 112.

The graded out imperfect particles that need to be built up into larger sizes are passed from table 100 by outlet 110 to the cooler 116 from which they are withdrawn through airlock 117 and passed by fan 36 and pipe 37, and aerating tube 38 to spill onto the perforated top of cone 14 where more solution is sprayed thereupon to be evaporated and leave additional solid material thereon, thus increasing the size until it is of such size as to pass out through the outlet 47.

In the modification shown in Fig. 2, the particles that are returned for retreatment are carried upwardly through feeder 38' by means of the screw conveyor 120 instead of being returned by the blower 36 of Fig. 1B. Also, the conveyor 122 carries the particles upwardly to pass outwardly and along the perforated surface 16' of cone 14. The sprayers and heaters are provided as in Fig. 1A. The rest of the operation is as described in connection with the other figures. This mechanical means for recirculation may be suited to certain rough chemicals where breakage is not objectionable. It is suitable in the evaporating chamber when the air-flow and the load on the exhaust system is to be minimized.

Many rearrangements of the apparatus described can be made to suit conditions. For instance, when the material that is discharged from chamber 1 is sufficiently well formed and graded the chamber 67 need not be used for further evaporation and grading.

Also, when needed, two successive spraying chambers like chamber 1 may be used followed by but one evaporating chamber like chamber 67.

The feeding ducts 38 and 55 can be operated as air-veyors or as fluidized-solids columns. When the column in feeder 38 is fluidized, no trouble is encountered by surges of material because such surges will spill into the chamber 1 without clogging sparger recirculation. When operated as an air-veyor, the discharge end can be lowered into the draft tubes 8, 78 to develop an injector action to induce more recirculation of solid particles.

It has been found that down-feed arrangement of air ducts 11 and 84 prevent stoppage, and that the space between perforated plate 6 and hopper 2 and between perforated plate 71 and hopper 70 is self-clearing.

When particularly sticky chemicals are processed, mechanical cleaning device may be provided for cleaning the perforated plates. Also, the throat of sparger at its bottom and the openings 39 and 71' may be provided with a mechanical agitator, not shown, to clear lumps when needed.

However, the solid material in the flash chamber 1 need not be operated at elevated moistures or otherwise become sticky. The tremendous surface available and the air-sweep that is available remove the vapors without elevating the moisture content of the circulating bed of solid particles materially. Also, the temperature usually can be kept below the sticky non-free flowing point and still operate at higher efficiencies than spray drying.

What is claimed is:

1. Apparatus for producing pelleted or bead-shaped solids comprising: a chamber; means for aerating particles in the chamber; an upstanding sparger tube in said chamber for transferring solid particles; deflecting means above the upper portion of said tube for shaping said particles while coincidently deflecting them downwardly in the chamber; a rotatable conically-shaped member adjacent said deflecting means for receiving said solids; spray means above said member for spraying a solution on the particles passing to said rotatable member in order to coat the particles; means in the chamber for heating the particles coincidently with the spraying of solution on the same; an inverted cone-shaped member in said chamber below the rotatable member for receiving coated particles from said rotatable member; an opening in the lower portion of the sparger tube adjacent the lower portion of the inverted member through which particles from the inverted member may be transferred to the sparger tube; means for removing volatile material from the chamber; exit means in the lower portion of the chamber for removing heavier solid particles from the lower member and from the chamber; conduit means connected to said exit means and disposed outwardly of the chamber for transferring the particles withdrawn from the chamber to an evaporating chamber; an evaporating chamber for removing bound moisture from the particles; means for removing the particles from the evaporating chamber; means for classifying the particles; and conduit means for returning unclassified particles to the first-named chamber.

2. Apparatus for coating solid particles with successive layers of a solution containing solidifiable material to form pellets or beads comprising: a chamber; means for aerating particles in the chamber; an upstanding sparger tube in said chamber for transferring solid particles from a lower portion of the chamber to an intermediate portion; deflecting means above said tube for shaping said particles while coincidently deflecting them outwardly and downwardly in said chamber; rotatable means adjacent said deflecting means for receiving and further shaping said particles; spray means above said rotatable means for spraying said solution on the particles passing thereto in order to coat the particles; means in the chamber for heating the particles coincidently with the spraying of solution on the same to solidify the coating thereon; and a delivery duct at the lower portion of the chamber for withdrawing coated particles therefrom.

3. Apparatus for coating solid particles with successive layers of a solution containing solidifiable material to form pellets or beads comprising: a chamber; means for aerating particles in the chamber; an upstanding sparger tube in said chamber for transferring solid particles from a lower portion of the chamber to an intermediate portion; deflecting means above the upper portion of said tube for shaping said particles while coincidently deflecting them outwardly and downwardly in said chamber; a rotatable conically-shaped member adjacent said deflecting means for receiving and further shaping said particles; spray means above said rotatable member for spraying said solution on the particles passing to said rotatable member in order to coat the particles; means in the chamber for heating the particles coincidently with the spraying of solution on the same to solidify the coating thereon; an opening in the lower portion of the sparger tube through which particles from the lower portion of the chamber may be transferred for recirculation through said sparger tube; a delivery duct at the lower portion of the chamber for withdrawing solid particles therefrom; and means for aerating the particles in said duct to permit passage therethrough of heavier particles.

4. Apparatus for producing pelleted solids comprising: a chamber; an upstanding sparger tube in said chamber for conducting solid particles therethrough; deflecting means above the upper portion of said tube for shaping said particles while coincidently deflecting them downwardly; a rotatable member below said deflecting means for receiving and further shaping said particles; spray means above said member for spraying a solution on the particles passing to said member in order to coat the particles; means in the chamber for heating the coated particles to solidify the coating thereon; means in the lower portion of the chamber for receiving the coated particles; an opening in the lower portion of the sparger tube through which particles from the lower portion of the chamber may be transferred for recirculation through said sparger tube; and means for removing heavier coated particles from the lower portion of the chamber.

5. Apparatus for coating solid particles with successive layers of a solution containing solidifiable material to form pellets or beads comprising: a chamber; an upstanding sparger tube in said chamber for transferring solid particles from one portion of the chamber to a more elevated portion; means for supporting a bed of solid particles in said first portion of the chamber; means for aerating the particles of said bed; an opening in the lower portion of the sparger tube through which particles from the bed may be transferred for recirculation through said sparger tube; deflecting means above the upper portion of said tube for shaping said particles while coincidently deflecting them outwardly and downwardly in said chamber; spray means for spraying said solution on the particles in order to coat the same; means in the chamber for heating the particles coincidently with the spraying and aerating of the same to solidify the coating thereon; and means for withdrawing heavier coated particles from the lower portion of the chamber.

6. Apparatus for coating solid particles with successive layers of a solution containing solidifiable material to form pellets or beads comprising: a chamber; means for aerating solid particles in the chamber; an upstanding sparger tube in said chamber for transferring solid particles upwardly from one portion of the chamber to a more elevated portion; deflecting means above the upper end of said tube for shaping said particles while coincidently deflecting them outwardly and downwardly in the chamber; spray means for spraying said solution on the particles passing from said deflecting means in order to coat the particles; means for heating the particles coincidently with the aeration and coating of the same to solidify the coating thereon; and means for withdrawing solid particles from the chamber.

7. A continuous process of coating solid particles with one or more layers of solid material to form pellets or beads which comprises aerating said solid particles in a chamber, passing the aerated particles from a lower portion of said chamber upwardly through a confined zone in said chamber, abruptly deflecting the particles issuing from said zone outwardly and downwardly, tumbling and spinning the deflected particles in the form of a revolving sheet, spraying a solution containing solidifiable material downwardly upon said revolving sheet of particles while coincidently applying heat thereto, thereby coating the particles, recirculating coated particles through said confined zone and deflecting them into the path of said solution being sprayed, and withdrawing heavier coated particles from the chamber.

8. A continuous process of coating solid particles with one or more layers of solid material to form pellets or beads which comprises aerating said solid particles in a chamber to form an aerated bed therein, passing the aerated particles from a lower portion of said bed upwardly through a confined zone in said chamber, abruptly deflecting the particles issuing from said zone outwardly and downwardly towards said bed, spraying a solution containing solidifiable material downwardly upon said deflected particles to coat the same, applying heat to the particles coincidently with the spraying and aerating of the same to solidify the coating thereon, recirculating coated particles through said confined zone and deflecting them into the path of said solution being sprayed, and withdrawing heavier coated particles from the chamber.

9. A continuous process of coating solid particles with one or more layers of a solution containing solidifiable material to form pellets or beads which comprises: aerating said particles in a chamber, passing the aerated particles from a lower portion of the chamber upwardly through a confined zone in said chamber, deflecting the particles issuing from said zone outwardly and downwardly, spraying said solution downwardly upon the deflected particles while coincidently applying heat thereto, thereby coating the particles and solidifying the coating thereon, continuously recirculating coated particles through said confined zone and deflecting them into the path of said solution being sprayed, and continuously withdrawing heavier coated particles from the chamber.

10. A process of coating solid particles with one or more layers of solid material to form pellets or beads which comprises: continuously aerating said solid particles in a chamber, continuously passing the aerated particles from a lower portion of said chamber upwardly through a confined zone in said chamber, continuously deflecting the particles issuing from said zone downwardly in said chamber, continuously spraying a solution containing solidifiable material downwardly upon said deflected particles while coincidently applying heat thereto, thereby coating the particles, and continuously withdrawing heavier coated particles from the chamber.

DONALD E. MARSHALL.

REFERENCES CITED

The following references are of record in the file of this patent:

UNITED STATES PATENTS

| Number | Name | Date |
| --- | --- | --- |
| Re. 20,119 | Sommer | Sept. 22, 1936 |
| 1,157,935 | Gray | Oct. 26, 1915 |
| 1,419,824 | Creighton | June 13, 1922 |
| 1,546,922 | Faber | July 21, 1925 |
| 2,059,983 | Dent et al. | Nov. 3, 1936 |
| 2,101,635 | Bender | Dec. 7, 1937 |
| 2,337,684 | Scheineman | Dec. 28, 1943 |
| 2,399,717 | Arveson | May 7, 1946 |